(12) United States Patent
Weston et al.

(10) Patent No.: US 6,391,815 B1
(45) Date of Patent: May 21, 2002

(54) COMBINATION SULPHUR ADSORBENT AND HYDROGENATION CATALYST FOR EDIBLE OILS

(75) Inventors: Eric J. Weston, Shepherdsville, KY (US); Pat McLaughlin, New Albany, IN (US); Robert Ritzmann, Louisville, KY (US)

(73) Assignee: Süd-Chemie Inc., Louisville, KY (US)

( * ) Notice: Subject to any disclaimer, the term of this patent is extended or adjusted under 35 U.S.C. 154(b) by 0 days.

(21) Appl. No.: 09/483,884

(22) Filed: Jan. 18, 2000

(51) Int. Cl.$^7$ ................................................ B01J 29/08
(52) U.S. Cl. ........................... 502/79; 502/60; 208/208; 208/244; 208/299
(58) Field of Search ................................ 208/244, 208, 208/299; 502/60, 79

(56) References Cited

U.S. PATENT DOCUMENTS

| | | |
|---|---|---|
| 2,882,243 A | 4/1959 | Milton |
| 2,882,244 A | 4/1959 | Milton |
| 3,760,029 A | 9/1973 | McCoy |
| 3,816,975 A | 6/1974 | Collins |
| 3,864,452 A | 2/1975 | Chi et al. |
| 4,098,684 A | 7/1978 | Innes |
| 4,179,361 A | 12/1979 | Michlmayr |
| 4,188,285 A | 2/1980 | Michlmayr |
| 4,204,947 A | 5/1980 | Jacobson et al. |
| 4,225,417 A | 9/1980 | Nelson |
| 4,358,297 A | 11/1982 | Eberly, Jr. |
| 4,446,005 A | 5/1984 | Eberly, Jr. et al. |
| 4,540,842 A | 9/1985 | Allen |
| 4,634,515 A | 1/1987 | Bailey et al. |
| 4,795,545 A | 1/1989 | Schmidt |
| 5,057,473 A | 10/1991 | Voecks et al. |
| 5,106,484 A | 4/1992 | Nadler et al. |
| 5,146,036 A | 9/1992 | Hovis |
| 5,258,346 A | 11/1993 | Huang et al. |
| 5,322,615 A | 6/1994 | Holtermann et al. |
| 5,463,096 A | 10/1995 | Lok |
| 5,803,953 A | 9/1998 | Rojey et al. |
| 5,807,475 A | 9/1998 | Kulprathipanja et al. |
| 5,843,300 A | 12/1998 | Zinnen et al. |
| 5,873,700 A | 2/1999 | Kuhlman |

FOREIGN PATENT DOCUMENTS

| | | |
|---|---|---|
| WO | 94/06557 | 9/1993 |

*Primary Examiner*—Deborah D. Carr
(74) *Attorney, Agent, or Firm*—Scott R. Cox

(57) ABSTRACT

An improved catalyst for edible oil hydrogenation produced by the incorporation of a sulphur adsorbing zeolite with a supported nickel hydrogenation catalyst. The zeolite is a cation-exchanged form of low silica faujasite with a silica to alumina ratio from about 1.8 to 2.1. The hydrogenation catalyst is a supported nickel catalyst. The zeolite is incorporated into the stabilization media with the reduced hydrogenation catalyst to form a physical blend of sulphur adsorbing zeolite and reduced nickel hydrogenation catalyst in a stabilization medium.

16 Claims, 1 Drawing Sheet

Modified Fish Oil Activity Test

Evaluation of Variable Zeolite Amounts

Percentage of Zeolite in Catalyst Sample

COMBINATION SULPHUR ADSORBENT AND HYDROGENATION CATALYST FOR EDIBLE OILS

BACKGROUND OF INVENTION

1. Field of Invention

The present invention involves a novel combination of an adsorbent for sulphur compounds and a hydrogenation catalyst for use with edible oils. More particularly the invention relates to a sulphur compound-adsorbing, low-silica zeolite combined with a nickel hydrogenation catalyst in a stabilization medium, to form a combination product, which product adsorbs sulphur compounds present in edible oils while the edible oils are being hydrogenated.

2. Background Art

Supported metal catalysts are known, and their use in numerous reactions, including the hydrogenation of edible oils, has been described in the literature. These supported metal catalysts are often utilized for the hydrogenation of edible oils to increase the saturation content from a low saturation content (approximately 180 iodine value units) to a very high saturation content (as low as approximately 0.5 iodine value units). Products produced from these hydrogenated edible oil products include, for example, salad oils, margarines, shortenings, soaps, candles, and confections.

The term "supported metal catalyst" can be defined as a catalyst, whereby an active metal precursor (nickel, palladium, copper, cobalt, etc,) is deposited on an oxide support by means of precipitation, decomposition, or impregnation. One preferred supported metal catalyst is a nickel hydrogenation catalyst. References describing nickel-supported catalysts and their uses include U.S. Pat. Nos. 5,463,096 and 5,285,346, and PCT Application Number WO 94/06557. U.S. Pat. No. 5,463,096 describes a process for the preparation of supported nickel catalysts which are used particularly for the hydrogenation of fatty acids and vegetable oils, which are contaminated with sulphur compounds at a level less than about 10 parts per million. PCT Application Number WO 94/06557 describes the preparation of supported nickel catalysts to which promotion metals (particularly zinc) are added during the precipitation stage of catalyst formation. Both of these references disclose a traditional approach to edible oil hydrogenation catalyst improvement, i.e., catalyst performance is improved by altering the structure of the catalytic precursor oxides. The support medium serves only to hold the reduced, activated metal.

Zeolite products are often used as adsorbents for sulphur compounds. The term "zeolite" can be defined as a crystalline hydrated aluminosilicate. The basic structure of the zeolite is represented by the formula: $M_{2/n}O.Al_2O_3.XSiO_2.YH_2O$, whereby M is a metal cation and X, Y, and n are numbers. Each type of zeolite has its own specific pore characteristics, which allows it to adsorb specific targeted substances. The cations present in the zeolite composition are usually Group I or Group II metals, particularly sodium or potassium. In addition to unexchanged sodium and/or potassium zeolites, the zeolite product may be ion-exchanged with other metal cations, such as zinc, copper, barium, or manganese. See, for example, U.S. Pat. Nos. 3,864,452, 4,358,297 and 5,843,300.

Zeolites or molecular sieve products are designed as physical adsorbents for a number of products, including sulphur compounds. For example, U.S. Pat. Nos. 2,882,243 and 2,882,244 disclose molecular sieves useful for the adsorbence of hydrogen sulphide and other compounds at ambient temperatures. In addition, U.S. Pat. No. 3,760,029 discloses the use of synthetic faujasites as adsorbents for dimethyldisulphide removal from normal paraffins. Further, U.S. Pat. No. 3,816,975, 4,540,842 and 4,795,545 disclose the use of a standard molecular sieve 13X as a sulphur adsorbent for the purification of liquid hydrocarbon feedstocks. See also U.S. Pat. No. 4,098,684 and the European Patent Application 781,832.

Various adsorption processes and products have been disclosed for the removal of sulphur compounds from catalytic process feed streams. In one conventional process, these adsorption products are placed upstream from the catalyst to remove the sulphur compounds from the feed stream prior to the catalyst reaction with the feed stream. Chemisorption of sulphur-containing compounds using metal or metal oxide adsorbents is the most popular method used for the removal of these sulphur compounds from these feed streams. These metal oxides may include nickel, platinum, cobalt or copper in zerovalent form or zinc, manganese, cadmium, or copper oxides, either alone or secured to a support structure. For example, U.S. Pat. No. 4,634,515 discloses a sulphur trap adsorbent for sulphur-sensitive, reforming catalyst protection, wherein the catalyst comprises nickel on a support. At least 50 percent of the nickel is in a reduced zerovalent state. U.S. Pat. No. 4,204,947 discloses copper metal, copper oxide, or copper chromite secured on an inorganic porous carrier as an adsorbent for the removal of mercaptans from hydrocarbon oils. U.S. Pat. No. 4,179,361 describes an adsorbent for mineral oil purification which comprises cobalt oxide on a porous alumina. U.S. Pat. No. 4,225,417 discloses the use of manganese or manganese oxide on a support for sulphur scavenging and catalytic reforming catalyst protection.

In an effort to decrease adsorbent costs, the use of multistaged purification has been suggested. For example, U.S. Pat. No. 4,446,005 discloses a guard bed for reforming catalysts which comprises two components: nickel metal on an activated alumina, or aluminosilicate and copper, zinc, or chromium oxide on a porous support. U.S. Pat. No. 5,322,615 discloses nickel or platinum on alumina as a first step adsorbent, and potassium on alumina as a second step adsorbent. U.S. Pat. No. 5,106,484 teaches a three stage purification using a NaY synthetic zeolite, nickel on an activated alumina, and manganese oxide as adsorbents for sulphur compounds.

Particular types of zeolite with transition metal oxides have also been disclosed for the adsorption of sulphur compounds in U.S. Pat. Nos. 4,188,285; 5,057,473; 5,146,036; 5,807,475, and 5,843,300.

The hydrogenation process for edible oils is usually accomplished using a slurry phase reactor. During that process, a specified amount of edible oil is placed within a stirred/heated vessel with a measured amount of catalyst. Under elevated temperature and pressure, the catalyst hydrogenates the edible oil. Problems frequently arise during this process when the edible oil contains sulphur compounds. These sulphur compounds poison the hydrogenation catalysts used during the slurry phase. Nickel catalysts, which are useful for the hydrogenation reaction, are especially sensitive to sulphur poisoning on their active surfaces. Poisoning of these nickel catalysts results in longer then desired hydrogenation times, undesired side reaction products and, in some instances, poor quality of the finished product.

Accordingly, it is an aspect of this invention to provide an edible oil hydrogenation catalyst which is protected from catalytic poisoning by an adsorbent "in situ" with the catalyst.

It is a further aspect of the invention to provide a nickel-based hydrogenation catalyst that is combined with a zinc-exchanged form of a low-silica faujasite adsorbent either alone or preferably with a stabilization medium for the adsorption of sulphur compounds present in a feed stream.

It is a still further aspect of the invention to provide a combination sulphur adsorbent and hydrogenation catalyst, whereby the adsorption rate of the adsorbent is equal to or higher than the adsorption rate of the hydrogenation catalyst.

It is a further aspect of the invention to provide a combination sulphur compound adsorbent and hydrogenation catalyst in a stabilization medium which reduces the time necessary for hydrogenation of edible oils from that of conventional hydrogenation catalysts.

It is a further aspect of this invention to provide a method for improving the performance of hydrogenation catalysts used in edible oil hydrogenation, where the edible oil is contaminated with sulphur-based compounds.

Still further objects and advantages will become apparent from consideration of the ensuing description of a preferred embodiment of the invention and examples thereof.

SUMMARY OF THE INVENTION

In accordance with the present invention there is provided a combination oil hydrogenation catalyst/sulphur adsorbent comprising
  a) an oil hydrogenation catalyst and
  b) a zeolite sulphur adsorbent.
Preferably, the oil hydrogenation catalyst and zeolite sulphur adsorbent are blended with a stabilization medium in which the catalyst and the adsorbent are admixed. Preferably the oil hydrogenation catalyst is a nickel on refractory oxide catalyst. The zeolite sulphur adsorbent is preferably a low silica faujasite with a silica to alumina ratio from about 1.8:1 to about 2.1:1, wherein the cations on the low silica faujasite are ion exchanged in an inequivalent excess of equilibrium of zinc ions or zinc containing cations or polycations.

The stabilization medium is any encapsulation medium which can encapsulate the oil hydrogenation catalyst and the zeolite sulphur adsorbent, and preferably is a saturated triglyceride with a low iodine value. The mixture of the hydrogenation catalyst and the sulphur adsorbing zeolite may also be stabilized by using an air/carbon dioxide mixture which produces a deactivation reaction of the reduced active metal species, as opposed to encapsulation with the stabilization medium.

The invention is also a process for the production of a combination oil hydrogenation catalyst and sulphur adsorbent stabilized in a stabilization medium comprising preparing the oil hydrogenation catalyst, acquiring the zeolite sulphur adsorbent, preparing the stabilization medium, and mixing the catalyst and adsorbent with the stabilization medium. Alternatively, the catalyst/zeolite mixture can be stabilized using an air/carbon dioxide blend to form a combination product.

The invention is also a process for hydrogenation of sulphur-contaminated vegetable, animal, marine, or mineral oils, and removal of sulphur-compound contamination from those oils during hydrogenation comprising:
  a) preparing a combination product comprising an oil hydrogenation catalyst and sulphur adsorbent, blended with a stabilization medium,
  b) mixing that combination product with an edible oil contaminated with sulphur compounds,
  c) adsorbing a portion of the sulphur-contaminated compounds contained in the edible oil using the sulphur adsorbent, and
  d) hydrogenating the oil using the hydrogenation catalyst.

DESCRIPTION OF THE INVENTION

Figure 1:
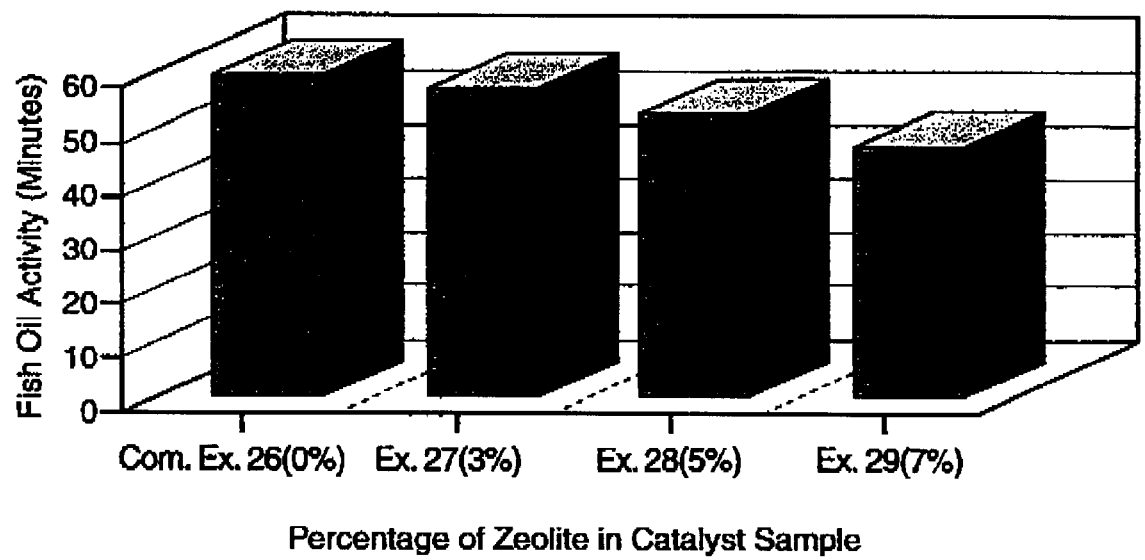
FIG. 1 is a graph comprising the performance of comparative Example 26 with Examples 27, 28, and 29.

The product of the invention is an animal, marine, mineral, or vegetable oil hydrogenation catalyst and sulphur adsorbent combination product preferably including the following components:
  a) a conventional oil hydrogenation catalyst;
  b) a specialty zeolite-sulphur adsorbent; and
  c) a stabilization medium in which the catalyst and the adsorbent are blended.

The hydrogenation catalyst of this invention is preferably a nickel catalyst comprised of about 10 to about 90 weight percent nickel oxide on a refractory oxide, wherein said weight percent is based on the overall weight of the catalyst. Preferably the catalyst contains about 30 to about 70 weight percent nickel oxide. Although primarily a nickel oxide catalyst, the catalyst can be modified with minor amounts, up to about 50 weight percent based on the weight of the catalyst, of other active metal oxides, such as copper oxide, cobalt oxide, magnesium oxide, zirconium oxide, and tungsten oxide.

The refractory oxides which are used as carriers for the nickel oxide are preferably silica and alumina, although other conventional carriers can be used. Mixtures of the two oxides can also be used, wherein the mixture can contain up to equal amounts of each refractory oxide. Modification with up to 40 weight percent of alkali metal oxides, alkaline earth metal oxides, or rare earth metal oxides, or mixtures of these oxides can also be used for specific applications. The preferred refractory oxide is silica. The preferred modification is with magnesium oxide.

The catalyst of this invention is preferably formed into pastilles of which its size is not particularly critical.

In order for the catalyst to have good activity, the active metal or metals must be prepared such that it or they are highly dispersed on the carrier. The specific metal surface area on the catalyst surface that is available for the hydrogenation reaction can be determined by chemisorption measurements with hydrogen. The catalysts of this invention preferably have nickel surface areas of about 50 m$^2$ to about 100 m$^2$ of nickel per gram of catalyst.

The catalyst of this invention can be prepared by various methods for bringing the nickel oxide promoter and the refractory oxide, or precursors thereof, together followed by calcination. Precursors of nickel oxide include the various salts, such as nickel nitrate, oxalate, hydroxide, or carbonate, which decompose to nickel oxide upon calcination, or nickel amine carbonate which decomposes in the decomposition process. The refractory oxides can be used as the oxides in powder form or as gels, sols, silicates, or aluminates. Magnesium oxide can be added either as the oxide or salts, such as magnesium nitrate, magnesium carbonate, or magnesium hydroxide.

Uniform mixing of the nickel oxide or precursor and the refractory oxide or precursor can be achieved either by mechanical mixing of the oxides or by co-precipitation of the nickel onto the refractory oxide carrier. Various methods of precipitations can be used including constant and varied pH precipitations as well as decomposition of nickel amine carbonate.

The precursors of the nickel oxide and refractory oxide are separated from the aqueous medium, and then dried, and calcined.

The adsorbent product of the present invention is a low silica faujasite with a silica:alumina ratio from about 1.8:1 to about 2.1:1. It has been surprisingly discovered that improved adsorbents for sulphur contaminants can be produced where the low silica faujasite is zinc exchanged with an inequivalent excess of zinc, zinc ions or zinc-containing cations or polycations present on the faujasite crystal.

The preferred form of the zeolite is a low silica zeolite X. It has been surprisingly discovered that a zinc ion exchanged form of a synthetic faujasite with an inequivalent excess of the zinc ions displays an enhanced adsorbent capacity for sulphur compounds, even at low concentrations of sulphur-containing compounds, i.e. below 1 part per million. This high capacity for the removal of low sulphur-containing compounds, as well as the ability to remove sulphur down to low concentrations results in an enhanced level of sulphur purification for edible oils. The particularly preferred low silica zeolite is disclosed in application Ser. No. 09/453,736, filed on Dec. 2, 1999, and assigned to Zeochem. The entire disclosure of the referenced application is incorporated herein by reference.

An acceptable range for ion exchange of zinc ions in the faujasite structure is from about 20 to about 80 percent (equiv), preferably from about 60 to 80 percent (equiv.). However, for the adsorbent to be effective, it has been surprisingly discovered that regardless of the level of zinc ion exchange, there must be an excess of zinc containing ions, cations, or polycations on the faujasite structure. Preferably, the zinc ions, cations, or polycations are in excess of equilibrium in an amount greater than about 8 percent, more preferably from about 8 to about 20 percent. The general formula of such a zinc exchanged, low silica faujasite is as follows:

$$Zn_\gamma^{2+}(Zn_\alpha O_\beta)^{2+}_\rho Me_\psi^+ Me_\mu^{2+} Si_\delta Al_\tau O_\phi,$$

wherein $(Zn_\alpha O_\beta)^{2+}$ are polycations with the number of zinc atoms $\alpha$ from 2 to 8 and the number of oxygen atoms $\beta$ from 0 to 4; $\delta/\tau$, silicon/aluminum ratio varies from about 0.9 to about 1.05, $Me^+$ and $Me^{2+}$ are cations of alkali and alkaline-earth metals, and $\psi$ and $\mu$ represents the alkali and alkaline-earth metals ion exchange degrees, respectively, which varies from about 0.2 to about 0.8; wherein said zinc-exchanged low-silica faujasite contains an inequivalent excess of zinc so that the ratio of the sum of all cation equivalents to the aluminum equivalent content:

$$Y=(\gamma+\alpha\cdot\rho+\psi+\mu)/\tau$$

is above 1.08; and wherein said zinc polycations content $\rho$ corresponds to the ratio, $\rho=(\gamma-1)/\alpha$.

While not being bound to a particular methodology, it is believed that the zinc ions present in excess are in the form of cluster zinc or zinc oxide polycations of a general formula $[Zn_\alpha O_\beta]^{2+}$ wherein $\alpha$ varies from about 2 to about 8 and $\beta$ varies from about 0 to about 4. These cluster polycations are usually formed in a presence of partially hydrolyzed or reduced cations. For example, $[Zn_\alpha O_\alpha^{2+}]$ clusters are produced from the following reactions:

$$2Zn(OH)^+ \rightarrow [Zn_2O]^{2+}+H_2O, \quad (1)$$

or $$Zn(OH)^+ + Zn^{2+} \rightarrow [Zn_2O]^{2+}+H^+ \quad (2)$$

Alternatively, polycations of $Zn_2^{2+}$ type may be formed by the condensation reaction of mononuclear zinc ions with zero valent ions as follows:

$$Zn_2^{2+} + Zn^0 \rightarrow Zn_2^{2+} \quad (3)$$

The simultaneous occurrence of reactions (1)–(3) and the consecutive evolution of the reactions (2) or (3) leads to the formation of cluster polycations of the general formulae $Zn_\alpha O_\beta$, where $\alpha$ varies from 2 to 8 and $\beta$ varies from 0 to 4. In turn, it is believed that polycations' formation causes a significant excess of zinc equivalents content in zeolite relatively to mononuclear zinc ion species.

Generally the adsorbent product according to the invention is formed using a conventional ion exchange procedure, exchanging the sodium or potassium ions of the low silica faujasite powder or granule with zinc solutions, for example, zinc chlorides, nitrates, acetates, etc. Two different methodologies are preferable for the ion exchange. In one methodology a significant inequivalent excess of zinc is mixed with a low silica faujasite using very dilute 0.01 to 0.1 N zinc salt solutions with the pH of the solution between about 5.0 and 7.0. An alternative method consists of the use of concentrated 1 to 4 N zinc salt solutions for the ion exchange with a controlled pH in the range of about 5.6 to 6.2 over the full exchange procedure. Any other method can also be used if it results in an inequivalent excess of zinc ions or cations on the faujasite crystal.

After the ion exchange process has occurred, the adsorbent product is then washed to remove excess chloride ions, reducing the level of the chloride ions to about 2 parts per million or less. The adsorbent product is then dried at a temperature from about 100 to 120° C. The adsorbent product can be used in powder or aggregate form or formed into shaped particles. However, in a preferred embodiment the material is retained in a powder form.

Although the nickel catalyst and the low silica faujasite adsorbent can be merely mixed together for use with the edible oils, in a preferred embodiment the two components are blended with a stabilization medium for ease of utilization. Because the preferred use of these compositions is in edible oils, preferably the stabilization medium is formed from an oil or fat product which will melt and blend into the edible oil at hydrogenation temperatures. For example, in one preferred embodiment the stabilization medium is a saturated triglyceride, such as soybean stearine, with an iodine value of less than 10 (as measured by the standard AOCS method Cd 1–25). These triglyceride sources may include soybean, cottonseed, canola, palm, or corn oils.

The mixture of the hydrogenation catalyst and the adsorbent product can also be stabilized by other procedures, such as using an air/carbon dioxide mixture which produces a deactivation reaction of the reduced active metal species.

To prepare the end-product of the invention, the stabilization medium, such as a saturated triglyceride, is heated to a temperature at which it liquefies. The appropriate quantities of the nickel catalyst and sulphur adsorbent are then blended with the liquid stabilization medium and formed into particles or other shaped material for ease of utilization by conventional procedures.

When forming the nickel catalyst, adsorbent and stabilization medium end-product, the combination product preferably contains from about 10 to about 30 percent by weight nickel, about 3 to about 30 percent by weight low silica faujasite, and about 1 to about 40 percent by weight of the support for the nickel. The remaining composition of the product is preferably the stabilization medium, although other materials may be added to the combination product which do not interfere with either the hydrogenation process or sulphur removal. Preferably the nickel to zeolite ratios are in the range of about 1:1 to about 30:1 by weight.

In a preferred utilization of the combination product, the catalyst/sulphur adsorbent and stabilization medium are blended in situ with the oil product. The catalysts of this invention are particularly useful in the hydrogenation of animal, vegetable, marine, and mineral oils, particularly edible oils. These oils often have a sulphur content of about 1 to 300 parts per million by weight.

It has been surprisingly discovered that the use of the combination nickel catalyst with low silica faujasite adsorbent of the invention in an oil feed stream results in a reduction in the time necessary to hydrogenate oils. This reduction can be as much as about 40 percent. In addition, adequate levels of sulphur compound removal from the reaction product occurs even when the combination product is blended with the animal and vegetable oil in situ. It has been surprisingly discovered that the adsorbent of this combination product exhibits an adsorption rate equal to or faster than the adsorption rate of the hydrogenation catalyst. It is believed that this enhanced adsorption is due to the surprisingly efficient adsorption by the low silica faujasite adsorbent of sulphur compounds whose adsorption rate is equal to or faster than the adsorption rate for the hydrogenation catalyst.

In order to illustrate the present invention and the advantages thereof, the following examples are provided. It is understood that these examples are illustrative and do not provide any limitation on the invention. In particular, it is important to understand that the present invention is generally applicable to a broad range of adsorption of sulphur compounds from various vegetable, mineral, marine and animal oils.

Test Group I 50 grams of a supported nickel hydrogenation catalyst precursor oxide (commercial catalyst G-135A or G-53H) was obtained from United Catalysts Inc. of Louisville, Ky. This precursor oxide contained the following chemical composition by weight: 52% nickel oxide (NiO), 26% silica (SiO2), and 1.5% magnesium oxide (MgO). The balance of the catalyst composition resided in water (~18%), and trace metals such as aluminum, iron, and calcium (total of ~2.5%). The oxides were subjected to a chemical reduction by hydrogen gas for 4 hours at about 430° C. The reduced material was subsequently cooled to approximately 175° C. under nitrogen gas.

While the reduced material was cooling, the stabilization media was prepared. 150 grams of soybean stearine flakes (Iodine Value<3.0) were melted and maintained at a temperature of approximately 75 ° C. Into the melted stearine was added 15 grams of a sulphur-adsorbing zeolite material. The specialty zeolite was obtained from Zeochem USA (of Louisville, Ky.). The designation of the zeolite was DSA 10-04. This zeolite was a zinc-exchanged form of a low silica faujasite with a silica to alumina ratio of 2:1. The zinc ion exchange degree was 70% with an inequivalent zinc excess of 14% in the zeolite product.

The stearine/zeolite mixture was homogenized manually by mixing the materials in a glass beaker with a glass-stirring rod. Mixing time was approximately 2–3 minutes.

The stearine/zeolite mixture was then added to the reduced supported nickel material with mixing. The mixing method was identical to the method employed to combine the zeolite with the soybean stearine stabilization medium. This mixture was then poured onto a flat metal surface and allowed to cool. Upon cooling to below 67° C., the mixture hardened and was sized into small flakes by passing through a series of graduated sieves.

The finished product was analyzed with the following results: 10–12% nickel (with a measured sample reduction value of 35–55%), 3–4% zinc (due to the zeolite), and 0.5–1.0% magnesium oxide. The balance of the composition was the saturated soybean stearine and the silica support. The stearine to zeolite ratio was 10:1. The nickel oxide to zeolite ratio was 3.3:1. The percentage of zeolite in the homogeneous mixture was 7%. All measures are by weight.

The finished product was evaluated for hydrogenation ability by testing in two separate edible oil feedstocks. The first testing feedstock was a commercially refined and bleached Menhaden Fish Oil acquired from Omega Protein of Reedville, Va. The second testing feedstock was produced artificially by the addition of Butyl Sulphide to the base Menhaden Fish Oil described above.

The feedstock fish oil possessed an approximate Iodine Value of 180.0 and contained approximately 12–16 parts per million of sulphur as determined by Inductively Coupled Plasma—Optical Emission Spectroscopy (ICP-OES). Approximately 800 grams of the fish oil was placed into a two (2)-liter stainless steel PARR autoclave. To the fish oil was added an appropriate amount of the finished product to achieve a loading of 0.058%, based on the weight percentage of nickel to oil. The PARR reactor was sealed, evacuated, and the temperature of the oil elevated to approximately 180° C. Approximately 15 minutes was required to elevate the test oil from room temperature to 180° C. The agitation rate of the reactor was maintained at approximately 1000 revolutions per minute. When the reactor achieved the target temperature of 180° C., hydrogen was introduced into the reactor and maintained at a pressure of 25 PSIG. The reaction was allowed to proceed isothermally with the excess heat generated by the reaction removed from the reactor via a cooling coil inside the autoclave. The activity of the product was determined to be the time required to reduce the Iodine Value of the fish oil from approximately 180.0 to approximately 80.0. Three samples were produced in the manner described above. Testing results are tabulated in Table I.

Three samples (Comparative Examples 1, 2, and 3) were produced using commercial catalysts alone without incorporating the zeolite product into the stabilization media in the manner described above (Comparative Examples 1, 2 and 3). Additional samples were then prepared using the specialty zeolite incorporated as described (Examples 4, 5, 6, 7, and 8). The catalysts were acquired from United Catalysts Inc., of Louisville, Ky. Catalyst samples A and B were a commercially available hydrogenation catalyst G-135A. Catalyst C was a commercially available G-53H hydrogenation catalyst. The results of these tests were subsequently compared. In all cases, the zeolite-modified catalyst improved the reaction rate of the catalyst by a minimum of 17%.

TABLE I

Menhaden Fish Oil Test Time to I.V. End Point

| Sample ID | Run Number of Units | Reaction Time (Minutes) | Iodine Value Units | Improvement % |
| --- | --- | --- | --- | --- |
| Comparative Example 1 Catalyst A | 1 | 47 | 80.9 | Base Case |
| Example 4 Catalyst A + Specialty Zeolite | 1 | 37 | 80.5 | 21 |
| Example 5 | 2 | 39 | 81.5 | 17 |

TABLE I-continued

Menhaden Fish Oil Test Time to I.V. End Point

| Sample ID | Run Number of Units | Reaction Time (Minutes) | Iodine Value Units | Improvement % |
|---|---|---|---|---|
| Catalyst A + Specialty Zeolite | | | | |
| Example 6 | 3 | 35 | 80.0 | 26 |
| Catalyst A + Specialty Zeolite | | | | |
| Catalyst B | | | | |
| Comparative Example 2 | 1 | 45 | 79.9 | Base Case |
| Catalyst B | | | | |
| Example 7 | 1 | 33 | 78.9 | 27 |
| Catalyst B + Specialty Zeolite | | | | |
| Comparative Example 3 | 1 | 53 | 78.2 | Base Case |
| Catalyst C | | | | |
| Example 8 | 1 | 30 | 79.0 | 43 |
| Catalyst C + Specialty Zeolite | | | | |

Test Group II

A second evaluation test utilized a modified fish oil derived from the feedstock used in the first test group. To the original menhaden fish oil used with the Test Group I examples, 9 parts per million of sulphur were added. The additional sulphur was added in the form of butyl sulphide. The total sulphur content of this modified testing oil was determined to be approximately 21–25 parts per million; once again as analyzed by ICP-OES. Approximately 500 grams of the fish oil was placed into a one (1)-liter stainless steel PARR autoclave. To the fish oil was added an appropriate amount of the material to be tested to achieve a loading of 0.058%, based on the weight percentage of nickel to oil. The PARR reactor was sealed, evacuated, and the temperature of the oil elevated to approximately 180° C. Approximately 15 minutes were required to elevate the test oil from room temperature to 180° C. The agitation rate of the reactor was maintained at approximately 1000 revolutions per minute. When the reactor achieved the target temperature of 180° C., hydrogen was introduced into the reactor and maintained at a pressure of 25 PSIG. The reaction was allowed to proceed isothermally with the excess heat generated by the reaction removed from the reactor via a cooling coil inside the autoclave. The activity of the catalyst was determined to be the time required to reduce the iodine value of the fish oil from approximately 180.0 to approximately 70.0. Two of the three catalysts produced and tested in the first evaluation (Catalyst A and Catalyst B) were selected for testing in the modified feedstock test. Catalyst B was selected for an expanded ten run study to further explore the reproducibility of catalytic improvements. The results were tabulated in the following Table II.

TABLE II

Sulphur Modified Fish Oil Test Time to I.V. End Point

| Sample ID | Run Number of Units | Reaction Time (Minutes) | Iodine Value Units | Improvement % |
|---|---|---|---|---|
| Catalyst A | | | | |
| Comparative Example 9 | 1 | 59 | 69.9 | Base Case |
| Catalyst A | | | | |
| Example 10 | 2 | 58 | 71.5 | Base Case |
| Catalyst A | | | | |
| Example 11 | 1 | 54 | 71.5 | 8 |
| Catalyst A + Specialty Zeolite | | | | |
| Example 12 | 2 | 46 | 70.0 | 21 |
| Catalyst A + Specialty Zeolite | | | | |
| Example 13 | 3 | 48 | 71.4 | 18 |
| Catalyst A + Specialty Zeolite | | | | |
| Catalyst B | | | | |
| Comparative Example 14 | 1 | 56 | 71.1 | Base Case |
| Catalyst B | | | | |
| Comparative Example 15 | 2 | 56 | 69.1 | Base Case |
| Catalyst B | | | | |
| Example 16 | 1 | 45 | 69.9 | 20 |
| Catalyst B + Specialty Zeolite | | | | |
| Example 17 | 2 | 47 | 72.1 | 16 |
| Catalyst B + Specialty Zeolite | | | | |
| Example 18 | 3 | 52 | 72.8 | 7 |
| Catalyst B + Specialty Zeolite | | | | |
| Example 19 | 4 | 45 | 68.2 | 20 |
| Catatyst B + Specialty Zeolite | | | | |
| Example 20 | 5 | 43 | 69.3 | 23 |
| Catalyst B + Specialty Zeolite | | | | |
| Example 21 | 6 | 51 | 69.9 | 9 |
| Catalyst B + Specialty Zeolite | | | | |
| Example 22 | 7 | 45 | 71.8 | 20 |
| Catalyst B + Specialty Zeolite | | | | |
| Example 23 | 8 | 45 | 70.2 | 20 |
| Catalyst B + Specialty Zeolite | | | | |
| Example 24 | 9 | 45 | 70.0 | 20 |
| Catalyst B + Specialty Zeolite | | | | |
| Example 25 | 10 | 44 | 70.3 | 21 |
| Catalyst B + Specialty Zeolite | | | | |

Once again, the zeolite modified catalyst samples produced significantly improved results over the non-zeolite-incorporated samples. The average improvement in this case was approximately 18.5%, based on rate improvement. Hydrogenation performance of the nickel catalyst was clearly enhanced as the amount of zeolite added to the stabilization media was increased.

Test Group IV

The next group of samples utilized a reduced and stearine stabilized commercial sample. This sample, referred to as catalyst D (Engelhard catalyst, tradename "Nysosel" 545), is a commercially available nickel hydrogenation catalyst for edible oil hydrogenation applications. This base catalyst (Comparative Example 30) and a zeolite-modified version (Example 31) were evaluated in the modified menhaden fish oil. The results from the two samples were compared to determine if conventional slurry hydrogenation catalysts could be improved by the zeolite incorporation procedure. The zeolite modified catalyst (Example 31) was produced in the following manner: Approximately 50 grams of Catalyst D were placed into a 250-milliliter beaker and allowed to melt over a steam bath. An appropriate amount of zeolite to produce a calculated ratio of 30% zeolite to nickel was added to the melted mixture. The same manual stirring mechanism utilized in the previous examples was used to homogenize the zeolite/melted catalyst mixture. This mixture was poured onto a cool metal tray and allowed to harden. The hardened mixture was sized into small flakes by passing through a series of graduated sieves. The product was tested using the same procedure utilized in Test Group I discussed above. The results were tabulated into the attached Table III.

TABLE III

Modified Menhaden Fish Oil Test
Commercial Sample D

| Sample ID | Run Number Units | Reaction Time (Minutes) | Iodine Value Units | Improvement % |
|---|---|---|---|---|
| Comparative Example 30 Catalyst D | 1 | 78 | 69.5 | Base Case |
| Example 31 Catalyst D + Specialty Zeolite | 1 | 70 | 71.7 | 10 |

The rate of hydrogenation of the purchased commercial catalyst was improved approximately 10% with the addition of the specialty zeolite.

Test Group V

The next example illustrates the uniqueness of the catalyst/zeolite combination product. The combination product is optimized by the use of a nickel hydrogenation catalyst and the specialty zeolite. The addition of zinc oxide or zinc acetate to the stabilization media does not produce the same beneficial effects as the addition of the specialty sulphur adsorbing zeolite. To prove this assertion, two combination products were produced from the nickel hydrogenation catalyst A documented in the above Test Group I. The catalyst oxides were reduced as described but in one case a powdered zinc oxide (supplied by Nissan-Girdler Catalysts Inc.) was added to the stabilization medium and in the second case a powdered zinc stearate (commercially available under the tradename "Nuodex") was added to the stabilization medium. The two combination products were then tested in the Menhaden Fish Oil test described in Test Group I as Comparative Examples 36 and 37. The results were tabulated in Table V with comparison to the base case Catalyst A catalyst and the specialty zeolite modified Catalyst A catalyst.

TABLE V

Comparison of Zeolite vs Inorganic and Organic Zinc Species

| Sample ID | Run Number | Reaction Time (Minutes) | Iodine Value Units | Improvement % |
|---|---|---|---|---|
| Catalyst A Comparative Example 32 | 1 | 47 | 80.9 | Base Case |

TABLE V-continued

Comparison of Zeolite vs Inorganic and Organic Zinc Species

| Sample ID | Run Number | Reaction Time (Minutes) | Iodine Value Units | Improvement % |
|---|---|---|---|---|
| Catalyst A With Specialty Zeolite | | | | |
| Example 33 | 1 | 37 | 80.5 | 21 |
| Example 34 | 2 | 39 | 81.5 | 17 |
| Example 35 | 3 | 35 | 80.0 | 26 |
| Comparative Example 36 Catalyst A with Zinc Oxide | 1 | 60 | 100.0 | −28% |
| Comparative Example 37 Catalyst A with Zinc Stearate | 1 | 75 | 81.6 | −60% |
| | 2 | 55 | 80.1 | −17% |

Comparative Example 36 produced with the zinc oxide resulted in a combination product, which was vastly inferior to either the unmodified hydrogenation catalyst (Comparative Example 32) or the specialty zeolite modified version (Examples 33, 34, and 35). Comparative Example 37 produced with the zinc stearate also produced a final product which was not as active as the unmodified, or zeolite modified version. Clearly, the enhancement to the hydrogenation catalyst is due to the combination of the catalyst with the specialty zeolite product. The addition of other inorganic (zinc oxide) or organic (zinc stearate) zinc species does not produce the same effects.

As can be seen from the above results, the combination products of the present invention are more effective in the hydrogenation of sulphur containing oil feedstocks than the control (base case) catalysts. While the invention has been explained in relation to its preferred embodiments, it is too be understood that various modifications will become apparent to those skilled in the art upon reading the enclosed specifications. Therefore, it is understood that the invention disclosed is intended to cover such modifications as fall within the scope of the appended claims.

We claim:
1. A combination oil hydrogenation catalyst and sulphur adsorbent product comprising an oil hydrogenation catalyst blended with a zeolite sulphur adsorbent, wherein the zeolite sulphur adsorbent comprises a low silica faujasite with a silica to alumina ratio from about 1.8:1 to about 2.1:1.

2. The combination product of claim 1 wherein the oil hydrogenation catalyst comprises from about 10 to about 90 percent nickel oxide.

3. The combination product of claim 1 comprising from about 10 to about 30 percent nickel oxide.

4. The combination product of claim 1 comprising from about 3 to about 30 percent of a zeolite sulphur adsorbent.

5. The combination product of claim 1 wherein the oil hydrogenation catalyst comprises from about 10 to about 90 percent nickel oxide, and wherein the ratio of the nickel oxide to the zeolite is from about 1:1 to about 30:1, by weight.

6. The combination product of claim 1 wherein from about 40 to about 80 percent of the available cations on the low silica faujasite comprise zinc ions, and wherein at least about 8 percent of the zinc cations are in inequivalent excess of the total cation exchange capacity of the low silica faujasite.

7. A combination oil hydrogenation catalyst and sulphur adsorbent product comprising
an oil hydrogenation catalyst blended with
a zeolite sulphur adsorbent, and a stabilization medium in which the catalyst and the adsorbent are blended, wherein the zeolite sulphur adsorbent comprises a low silica faujasite with a silica to alumina ratio from about 1.8:1 to about 2.1:1.

8. The combination product of claim 7 wherein the oil hydrogenation catalyst comprises from about 10 to about 90 percent nickel oxide.

9. The combination product of claim 7 comprising from about 10 to about 30 percent nickel oxide.

10. The combination product of claim 7 comprising from about 3 to about 30 percent of a zeolite sulphur adsorbent.

11. The combination of claim 7 comprising from about 10 to about 90 percent stabilization medium.

12. The combination product of claim 7 wherein the oil hydrogenation catalyst comprises from about 10 to about 90 percent nickel oxide, and wherein the ratio of the nickel oxide to the zeolite is from about 1:1 to about 30: 1, by weight.

13. The combination product of claim 7 wherein the stabilization medium comprises a triglyceride product.

14. The combination product of claim 7 wherein the stabilization medium is an air/carbon dioxide mixture.

15. The combination product of claim 7 wherein from about 40 to about 80 percent of the available cations on the low silica faujasite comprise zinc ions, and wherein at least about 8 percent of the zinc cations are in inequivalent excess of the total cation exchange capacity of the low silica faujasite.

16. A process for the production of a combination oil hydrogenation catalyst and sulphur adsorbent comprising preparing an oil hydrogenation catalyst, acquiring a zeolite sulphur adsorbent, and blending the catalyst with the adsorbent in a stabilization medium.

* * * * *